United States Patent Office 3,402,743
Patented Sept. 24, 1968

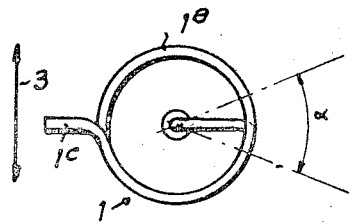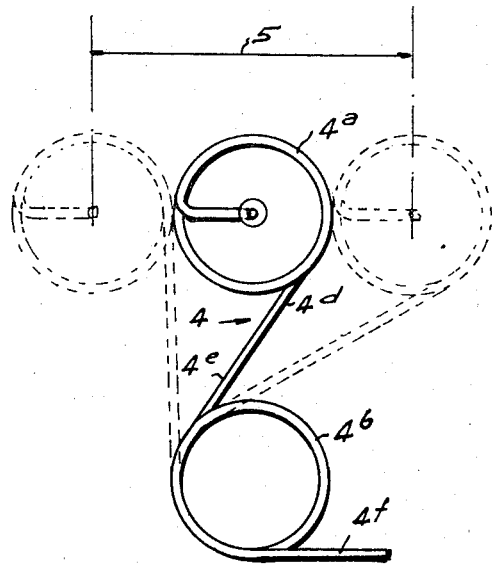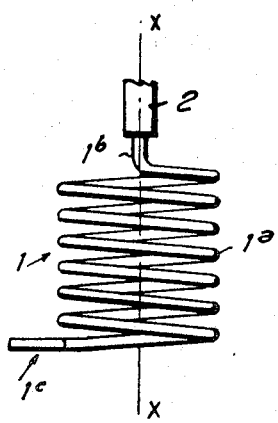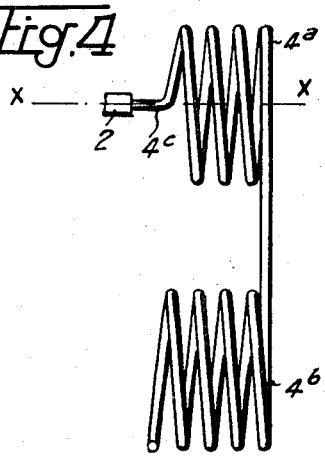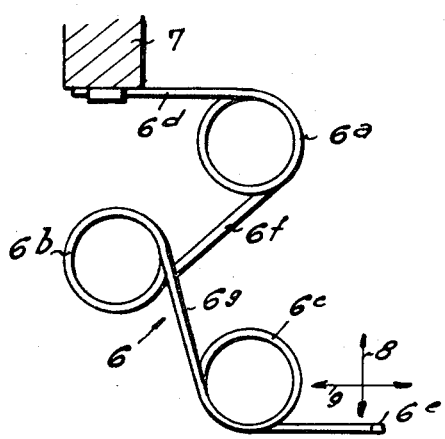

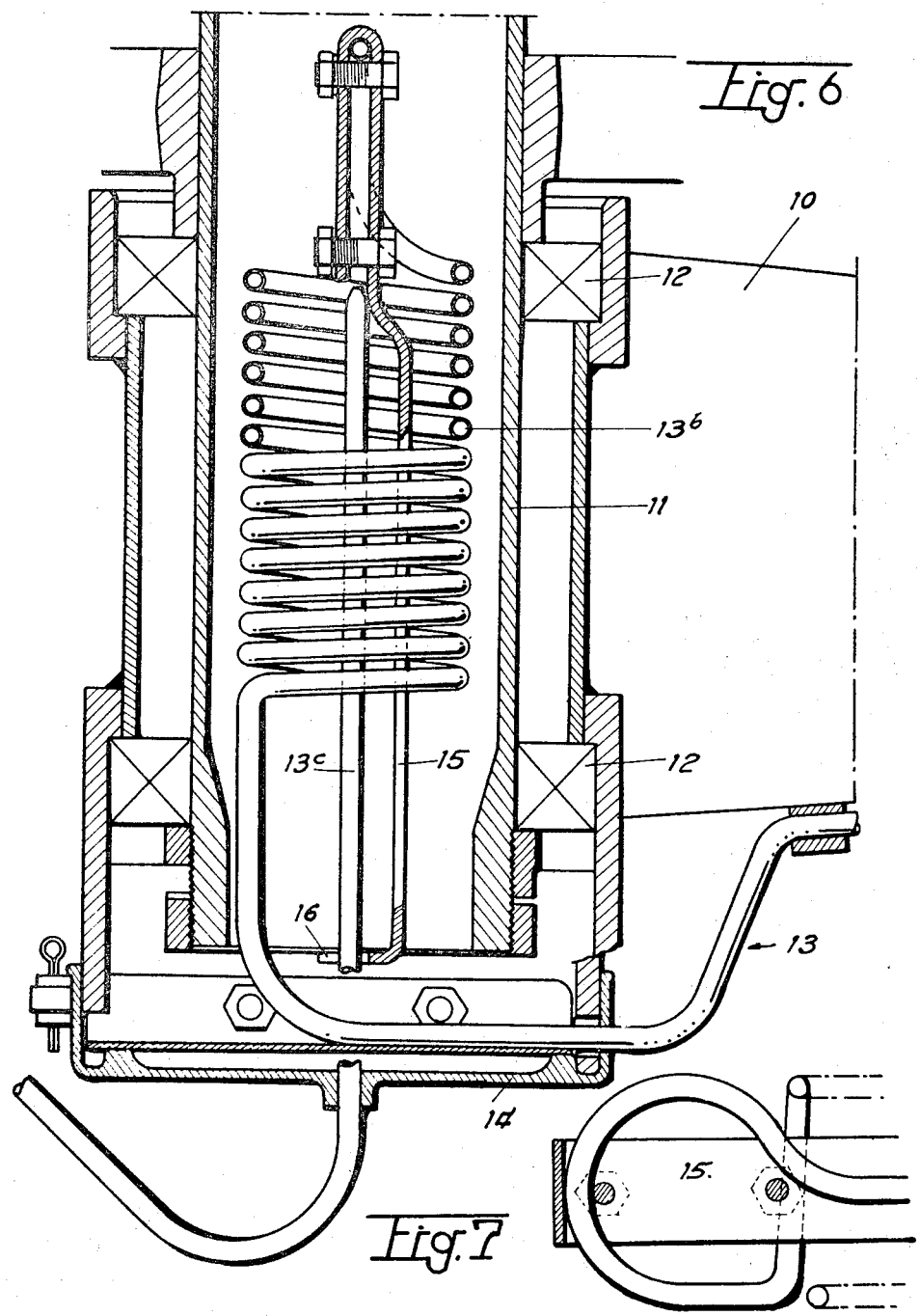

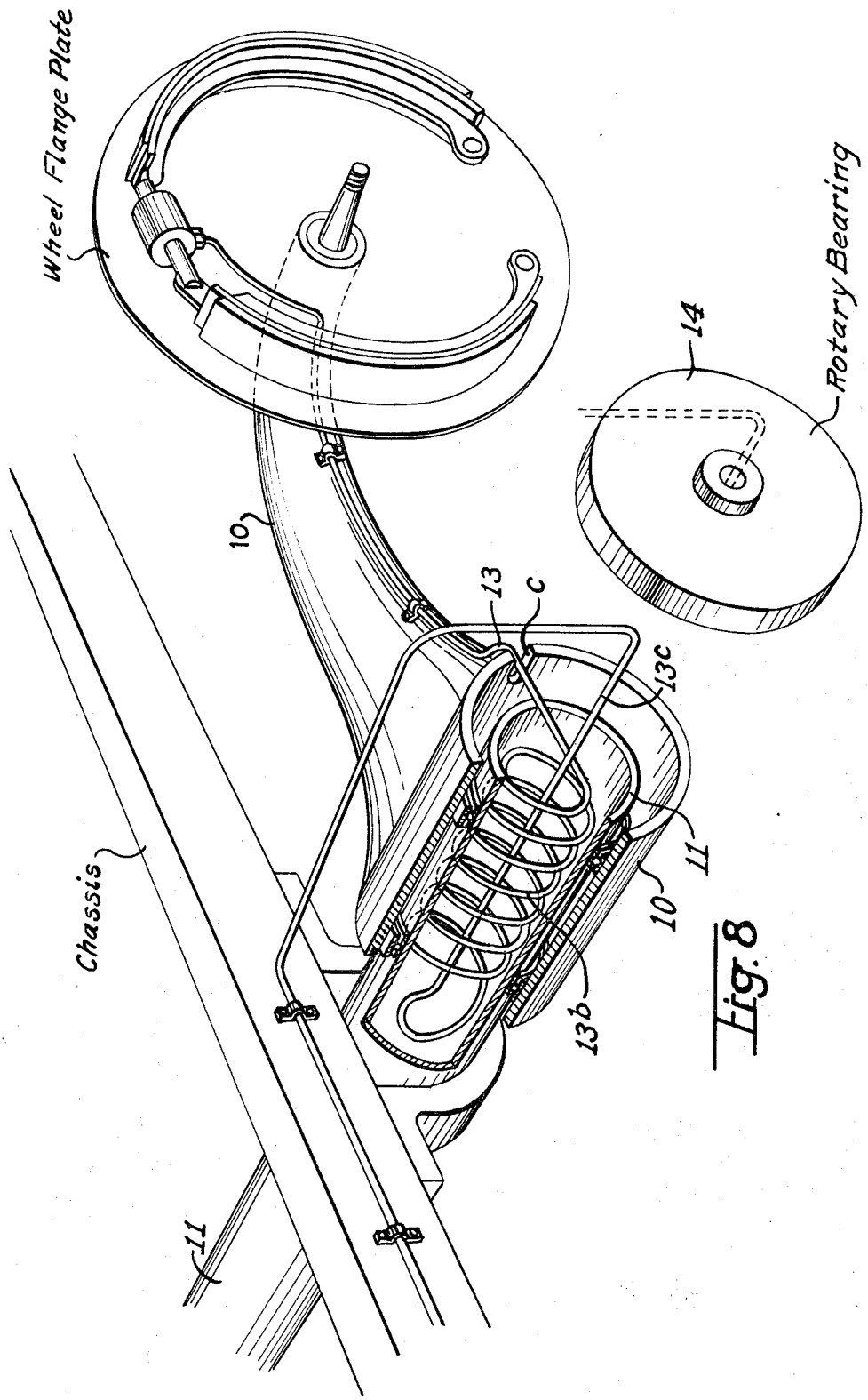

3,402,743
SUPPLY PIPE FOR FLUID UNDER PRESSURE
Antoine Brueder, Paris, France, assignor to Societe Anonyme Andre Citroen, Paris, France, a corporation of France
Filed July 20, 1965, Ser. No. 473,442
Claims priority, application France, July 23, 1964, 982,712
1 Claim. (Cl. 138—178)

ABSTRACT OF THE DISCLOSURE

Piping used to carry fluid under pressure which has a helical section which permits oscillation along the axis of the helix as well as pivotal movement in a plane perpendicular to the axis of the helix. One of the ends of the helix extends inwardly to the axis thereof and then extends outwardly on that axis so that only simple stress is present even when the end is connected to a member which pivotally oscillates.

---

This invention relates to supply pipes for fluid under pressure.

The connection between fixed pipes or other conduits for fluid under pressure and pipes or other conduits mounted on movable members, subject for example, to oscillating pivotal movements or translational movements, is generally effected by means of flexible pipes or by means of substantially rigid pipes and by pivotal joints.

These connection means give rise to difficulties. In particular, the flexible pipes are liable to damage whilst pivotal joints are relatively expensive and moreover, give rise to the risk of leakage.

The present invention has for its object a pipe or other conduit for supplying a movable member with fluid under pressure, which, whilst not being flexible in the ordinary sense of the term, gives rise to the possibility of sufficient deformation in order to allow the movable member the desired range of movement.

According to the present invention there is provided in a supply pipe for fluid under pressure, at least one helix disposed along the length thereof.

If the end of the portion of helical form connected to a movable member, is doubled back along the axis of the helix, then the movable member will be free to make a pivotal movement. On the other hand, if this end is perpendicular to the axis of the helix, the movable member will be free to make a translational movement following substantially a direction perpendicular to the said end. If the pipe has two portions of helical form of which the ends adjacent the movable member are substantially tangential to the helix under consideration and are arranged in two different directions, preferably perpendicular to one another, the movable member is capable of two degrees of freedom and can thus be displaced flexibly in its own plane in any direction desired.

The supply pipe, according to the invention, enables pivotal joints to be omitted, the communication being effected by simple but effective devices, for example, by a simple joint, arranged internally or externally with respect to the pipe, and with or without a locking device.

Various embodiments of a pipe or other conduit in accordance with the invention will now be described by way of example, with reference to the accompanying drawings, in which:

FIG. 1 is an elevational view of a first embodiment;
FIG. 2 is a plan view of the embodiment of FIG. 1;
FIG. 3 is an elevational view of a second embodiment;
FIG. 4 is a side elevation of the second embodiment;
FIG. 5 is an elevational view of a third embodiment;
FIG. 6 is a section of an axle and of an arm (stubshaft) for supporting a wheel of the axle, the brake of the wheel being supplied by a pipe as shown in FIG. 1; and
FIG. 7 is a view, in section, of a detail.
FIG. 8 is a perspective view partially in section and in part exploded of the arrangement of FIGS. 6 and 7.

Referring now to the drawings, and in particular to FIGS. 1 and 2, a pipe 1 includes a helical portion 1a. One of the ends 1b of this portion 1a is doubled back along the axis X—X of the helix and is secured, for example, by a simple joint, to a pipe 2; the other end 1c lies substantially in the plane of the last helix and is perpendicular to the axis X—X.

Under these conditions, the member to which the pipe 2 is secured and that with which the end 1c of the pipe is rigid, may be pivotable with respect to one another through an angle about the axis X—X. The member rigid with the end 1c can also undergo translational movement with respect to the first, as indicated by the arrow 3.

In the embodiment of FIGS. 3 and 4, a pipe 4 has two helical portions 4a and 4b. One end 4c of the helix 4a is doubled back on the axis X—X of this helix and fixed to the pipe 2; however, the end 4d of this helix, as well as the two ends 4e and 4f of the helix 4b, is perpendicular to the axis of the corresponding helix.

With this arrangement, the member to which the pipe 2 is secured can make either a pivotal movement about the axis X—X or a translational movement in a direction perpendicular to the plane of the axes of the two helices 4a and 4b, as indicated by the arrow 5.

In the embodiment of FIG. 5, a pipe 6 has three helical portions 6a, 6b and 6c, the ends of each of the helices being perpendicular to the axis of the corresponding helix. One of the ends 6d of the pipe 6 is rigid with a fixed member 7. The other end 6e of the pipe can thus be displaced in any direction whatsoever in the plane thereof, and in particular in the two mutually perpendicular directions 8 and 9. The same result can be obtained by omitting the helical portion 6c; in this case, two straight portions 6f and 6g are preferably perpendicular to one another. However, the addition of the helical portion 6c gives increased flexibility to the movement of the member to which the end 6a is fixed; the helical 6b is thus floating.

In FIGS. 6 to 8, an automobile support arm 10 (stub shaft) for an automobile wheel is seen which is mounted for oscillation on an axle tube 11, bearings 12 being interposed between the arm and the tube. The brake mechanism is supplied through a pipe 13 of which one end 13a is fixed to the arm 10. This pipe has a helical portion 13b which is disposed coaxially within the axle tube 11. The other end 13c of the pipe is doubled back along the axis of the axle and passes through an opening provided in the centre of a cap 14 rigid with the support arm 10.

The wheel as a whole is not shown but instead a standard wheel flange is shown mounted on the arm 10 and carrying a standard type of brake mechanism secured to the flange on the inside thereof.

The helices of the pipe 13 are supported, at the junction with the end 13c by a small plate 15 which is rigid with a flange 16 fixed to the end of the axle tube 11.

The support arm 10 can pivot upwardly and downwardly about the axle tube 11 rupturing the tube 13 because one end 13c of the tube is coaxial with the helix 13b.

It will be clear that the invention need not be considered to be limited to the embodiments described and shown but covers, on the contrary, all modifications. In particular, the helices may be more or less close to one another according to requirements; they may be separated from one another by lubricating elements.

I claim:
1. In an automobile, a transversely extending axle tube, a wheel support arm having a sleeve portion coaxial with and rotatably mounted about said axial tube and an arm portion extending outwardly from said sleeve portion, a metallic brake fluid conduit having a coiled portion disposed coaxially within said axle tube, one end of said coil merging into a segment of conduit which extends laterally of said coil through said sleeve portion and along said arm portion toward said wheel, the other end of said coil merging into a straight segment of conduit which extends back through said coil along the longitudinal axis thereof, said straight segment being connected with a portion of conduit supported upon the chassis of said automobile, said coil portion allowing rotational movement of said support arm without rupturing said brake fluid conduit.

References Cited

UNITED STATES PATENTS

| | | | |
|---|---|---|---|
| 1,443,550 | 1/1923 | Wilkinson | 141—4 X |
| 2,905,194 | 9/1959 | Smith et al. | 138—178 |
| 3,021,871 | 2/1962 | Rodgers. | |
| 2,299,160 | 10/1942 | MacPherson | 138—118 XR |
| 3,236,120 | 2/1966 | Fender. | |
| 3,245,431 | 4/1966 | Coe | 138—125 |
| 3,288,169 | 11/1966 | Moss | 138—118 |

FOREIGN PATENTS

| | | |
|---|---|---|
| 311,482 | 5/1929 | Great Britain. |
| 1,236,060 | 6/1960 | France. |

LAVERNE D. GEIGER, *Primary Examiner.*

B. KILE, *Assistant Examiner.*